June 6, 1961 G. SZEKELY 2,987,225
MEANS FOR DISPERSING PREDETERMINED QUANTITIES
OF LIQUID AT CHANGEABLE TIME INTERVALS
Filed April 22, 1957

Inventor
GEORGE SZEKELY

2,987,225
United States Patent Office
Patented June 6, 1961

2,987,225
MEANS FOR DISPERSING PREDETERMINED QUANTITIES OF LIQUID AT CHANGEABLE TIME INTERVALS
George Szekely, 32 Ben Zion Blvd., Tel-Aviv, Israel
Filed Apr. 22, 1957, Ser. No. 654,153
4 Claims. (Cl. 222—416)

The present invention relates to an apparatus for the automatic, intermittent delivery of a predetermined quantity of liquid, which quantity as well as the time interval between subsequent deliveries may be changed at will. The invention is particularly suited for the automatic delivery, in small quantities, of lubricating and cooling liquids to metal working machine tools of all kinds. Of course, these means may be used for other purposes as well, particularly so in the chemical industry and in food processing industries.

It is an object of the invention to provide a means for supplying lubricating fluids to machine tools and to achieve this in a simple and yet reliable manner.

It is a further object of the invention to provide an apparatus performing the above task, which is simple in construction and inexpensive.

The means for dispersing predetermined quantities of liquid at changeable time intervals comprise a measuring chamber from the upper portion of which a vent leads into the open, the liquid to be delivered being admitted into the measuring chamber through a duct, the flow of said liquid being controlled by means of a control screw, a syphon being provided in the said chamber, said syphon functioning between two predetermined levels, said levels being at a fixed distance from each other, means being provided to change the volume of the measuring chamber between the said levels so as to determine the quantity of liquid to be delivered at a time.

One of the features of the invention is that no movable organs such as floats, valves and the like are used for controlling the quantity of liquid to be delivered within a time interval, such movable organs frequently causing interruptions in the delivery and being unreliable.

In the annexed drawing there is shown by way of example a modification of the invention in a schematical manner.

Figure 1:
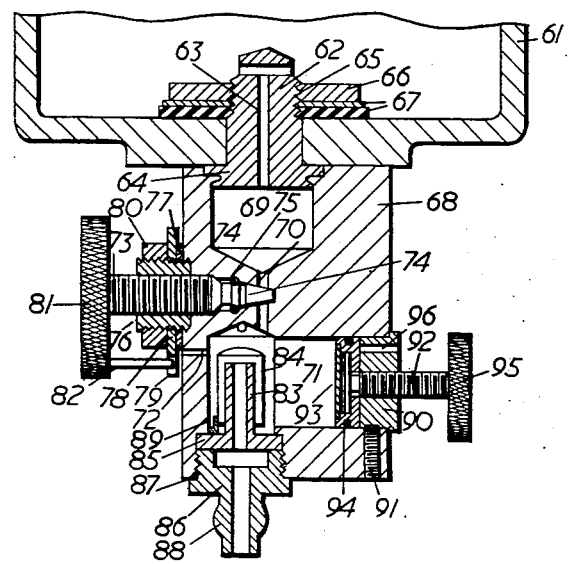
Figure 2:
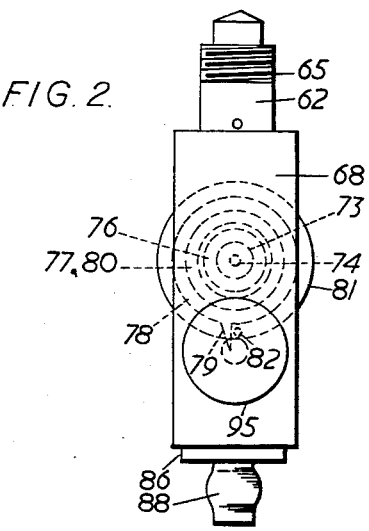

FIG. 1 is a vertical section through a constructional form of the apparatus; and FIG. 2 is a side view of the apparatus according to FIG. 1.

A constructional form of the apparatus is shown in the drawings wherein 61 designates the lower part of a storage container in the bottom of which there is provided an opening into which opening is inserted a bushing 62 with a narrow bore 63. This bushing 62 is provided at its lower end with a flange 64 which latter lies, from below, against the bottom of container 61. Bushing 62 has at its upper end an external screw thread 65 onto which is screwed a nut 66 with the interposition of two superposed washers 67. To the flange 64 of bushing 62 is fixed a block shaped casing 68 which latter in its upper part contains a chamber 69 into which leads from above the bore 63 of bushing 62 and out of which, at the bottom, leads a passage 70 into a measuring chamber 71 provided in the lower part of casing 68, which measuring chamber 71 is connected with the open by a vent 72 provided in its uppermost part. In an internally screw threaded bore perpendicular to passage 70 is provided a control screw 73 having a conical end 74 serving as a control member to adjust the flow through passage 70. Behind the conical end 74 screw 73 is provided with a packing 75. A bushing 76 enclosing screw 73 is set from the outside into a recess of casing 68 and fixed therein. This bushing 76 has an outside screw thread onto which is screwed a ring 77. Onto this ring 77 is pressed an annular plate 78 having an abutment 79 extending outwardly. Plate 78 is pressed to ring 77 by means of a nut 80 screwed onto bushing 76. Screw 73 has at its outer end a knob 81 on which is provided a pin 82 cooperating with the abutment 79 of annular plate 78. In the measuring chamber 71 there is provided a syphon composed of a pipe 83 and a cap 84 on the upper end of the pipe, enclosing this end in distanced relation thereto. The pipe 83 has a flange 85 near its lower end which is held in the wider part of a bore leading from below into the chamber 71 by means of a pierced plug 86 provided with a screw thread 87 screwed into the said bore. The outer end of plug 86 is formed as a mouthpiece 88 onto which a hose can be slid. Cap 84 is held on the flange 85 of pipe 83 by means of three arms 89, only one of which is shown in FIGURE 1. The measuring chamber 71 is closed to one side by means of a cover 90 held therein by a fixing screw 91. In cover 90 there is provided centrally an internally screw threaded bore in which screws a screw 92. At the inner end of screw 92 is provided a piston-like partition wall 93, slidable within chamber 71, which partition wall is provided on its periphery with a packing 94, so that the inner space of chamber 71, destined to receive the liquid to be dispensed, is closed tightly against the open. The outer end of screw 92 carries a knob 95. The space between partition 93 and cover 90 is in communication with the open by means of a vent 96 in cover 90.

The adjustment of the quantity of liquid to be dispensed is effected in the manner as described in connection with FIGURE 1 by shifting partition 93 within chamber 71 by means of screw 92 and the adjustment of the interval of time between subsequent outflows is effected by the control of the quantity of liquid flowing through passage 70 by means of control-screw 73, 74. The annular plate 78 is clamped between ring 77 and nut 80 in such a position that the pin 82 of knob 81 of screw 73 strikes the abutment 79 whenever the screw 73 is in such a position that its conical end 74 permits the passage of the desired quantity of liquid through passage 70. Should it be desired to interrupt the emission of liquid in the event of interruption of work, the screw 73 is screwed fast, wherefore less than a full turn is necessary. With the re-commencement of work, screw 73 is screwed back until pin 82 lies against the abutment 79 of annular plate 78, whereupon the same quantity of liquid passes passage 70 as before. Should it be desired to alter the quantity passing through passage 70, the annular plate 78 with abutment 79 is turned into an appropriate position after having loosened the nut 80, and when this position is attained nut 80 is again screwed fast.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. An apparatus for automatically dispensing determined quantities of liquid at equal time intervals comprising an adjustable nozzle having a controlled passage, a measuring chamber having a wall with a vent open to the atmosphere into which measuring chamber liquid is allowed to flow through said nozzle, a syphon in said measuring chamber effective between fixed levels, and piston means for changing the volume of said measuring chamber, said syphon including a vertical pipe and a cap surrounding the upper end of the pipe, the upper end of said cap being spaced above said upper end of said pipe, said cap having an open lower end spaced from said pipe below the upper end of said pipe.

2. An apparatus as claimed in claim 1 in which said piston means includes at least one piston-like partition wall which is slidable between other walls of the chamber in a fluid tight manner and which delimits the part of said measuring chamber intended to receive liquid.

3. An apparatus as claimed in claim 2, further including a block shaped casing, said measuring chamber, said nozzle and said siphon are all accommodated in said casing.

4. An arrangement as claimed in claim 3, in which a screw serves to control the flow of liquid through said passage, said screw being surrounded by a bushing set in said casing from the outside thereof, said bushing being provided with an external threaded member onto which screws an annular plate having an abutment cooperating with a pin provided on a knob of said screw, said annular plate being held between a ring and a nut both of which are screwed onto said threaded member of said bushing.

References Cited in the file of this patent

UNITED STATES PATENTS

| | | |
|---|---|---|
| 1,030,378 | Beckwith | June 25, 1912 |
| 1,226,758 | Dufty | May 22, 1917 |
| 1,750,872 | Bremer | Mar. 18, 1930 |
| 2,229,122 | Pershing | Jan. 21, 1941 |
| 2,709,450 | Holm et al. | May 31, 1955 |

FOREIGN PATENTS

| | | |
|---|---|---|
| 28,755 | Great Britain | Dec. 30, 1902 |